April 5, 1938.  D. FERGUSSON  2,113,018
VEHICLE TRACK
Filed Feb. 27, 1933  2 Sheets-Sheet 1
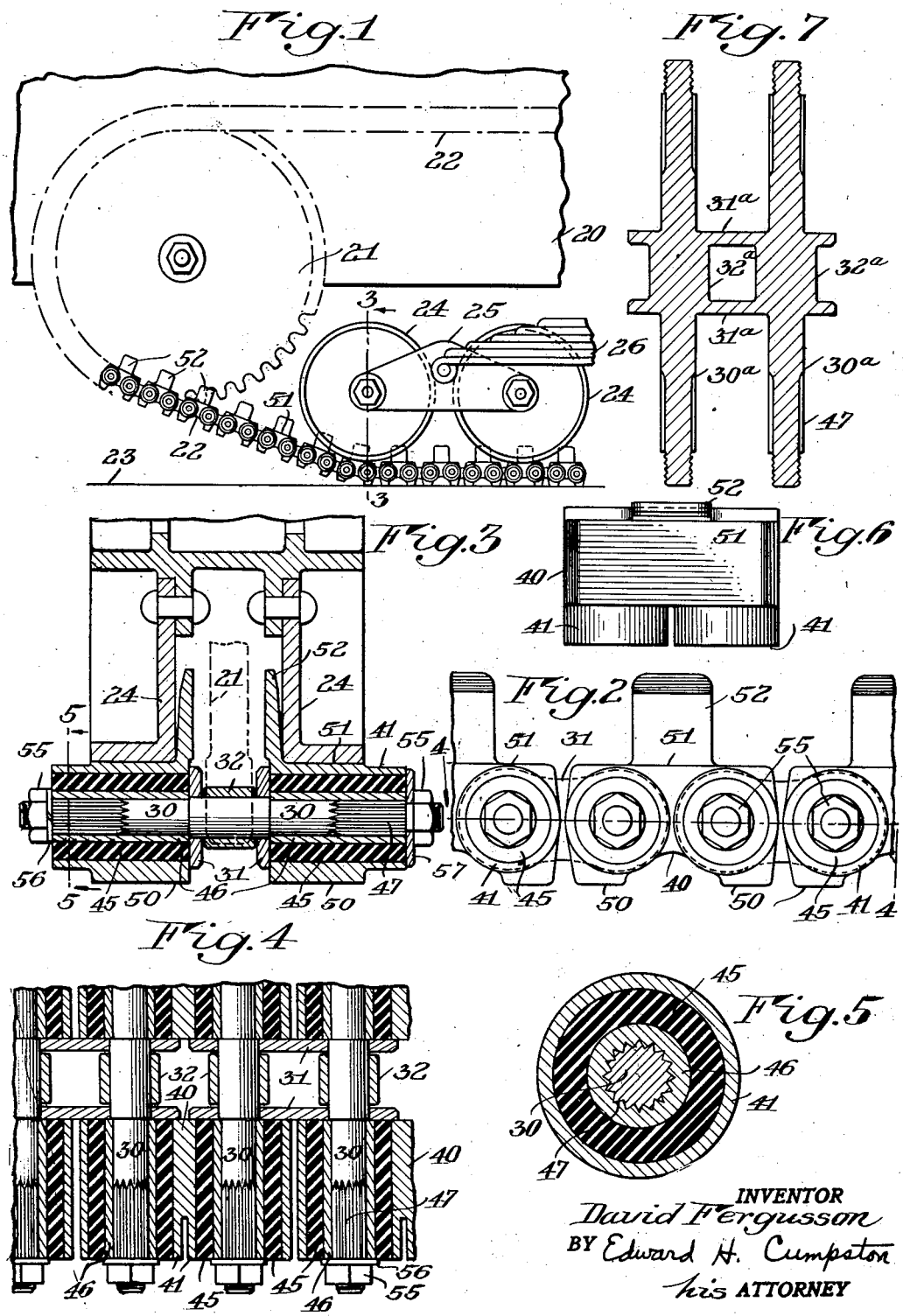

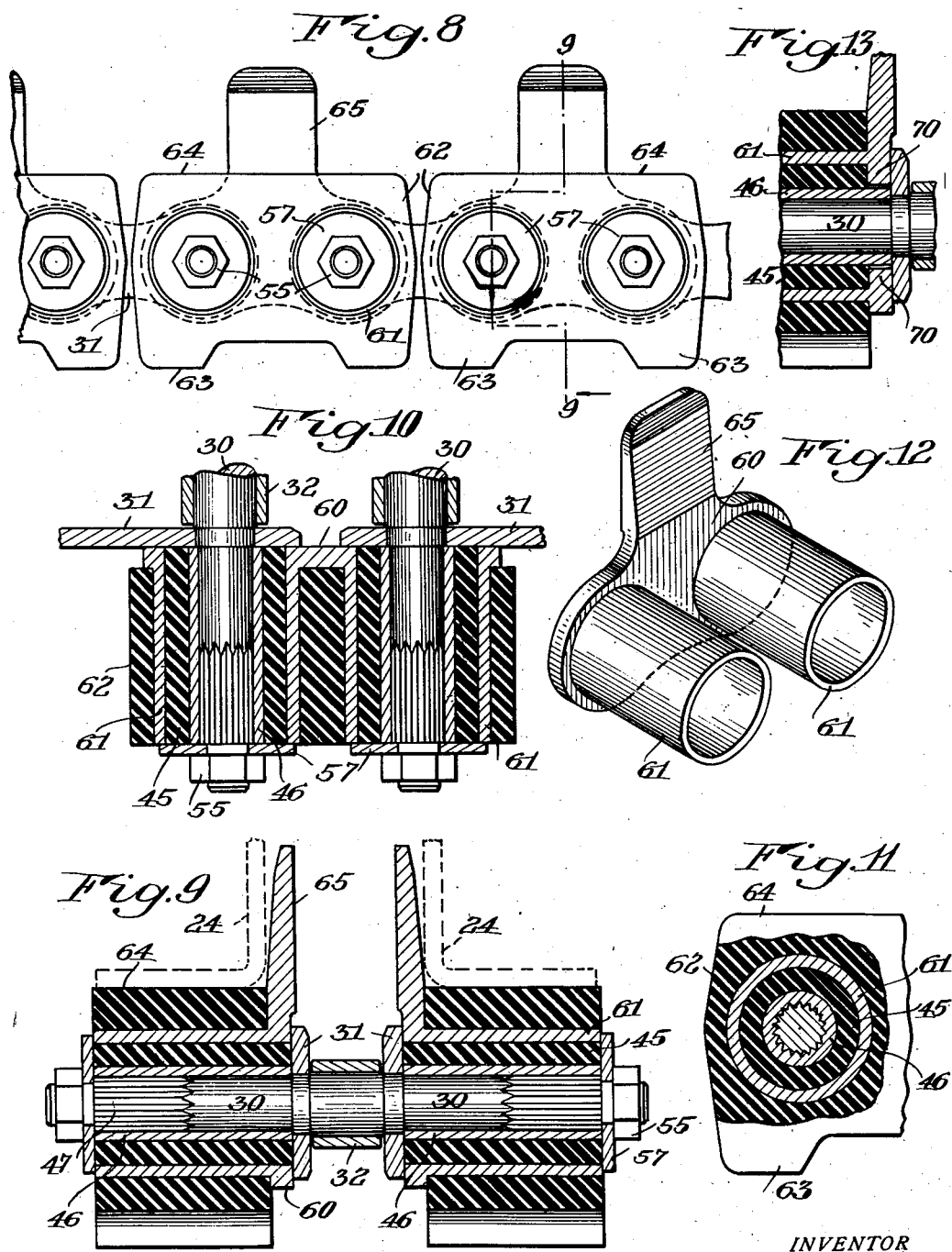

Patented Apr. 5, 1938

2,113,018

UNITED STATES PATENT OFFICE

2,113,018

VEHICLE TRACK

David Fergusson, Rochester, N. Y., assignor to James Cunningham, Son & Company, Rochester, N. Y., a corporation of New York Application February 27, 1933, Serial No. 658,730

18 Claims. (Cl. 305—10)

This invention relates to track chains or tread chains for vehicles of the type in which part or all of the weight of the vehicle is supported upon a track laid down by the vehicle as it advances. Such tracks are usually in the form of a continuous belt or chain which is laid upon the ground as the vehicle advances, which forms a trackway for wheels or rollers supporting the weight of the vehicle, and which is then picked up from the ground after the weight supporting wheels or rollers have passed over it.

Arrangements of this kind are frequently used in military machines such as tanks, and in commercial machines such as tractors and vehicles intended to travel over soft ground. The improved track chain of the present invention may be applied to any of these types of vehicles, and may be used to support the entire weight of the vehicle, or only a part of the weight, as desired.

An object of the present invention is the provision of an improved and more satisfactory track chain of this character.

Another object is the provision of a vehicle track chain so designed and constructed that it will have increased life over chains now in use, and particularly so that the relatively movable parts of the chain will not become materially worn even when the vehicle travels over sandy or gritty ground.

Still another object is the provision of a vehicle track chain embodying resilient material for connecting certain parts of the structure, and so designed that even when the resilient material disintegrates or wears out, the chain is not rendered useless but will still serve its purpose, at least for a limited time until repairs can be conveniently made.

To these and other ends the invention resides in certain improvements and combinations of parts, all as will be hereinafter more fully described, the novel features being pointed out in the claims at the end of the specification.

In the drawings:

Fig. 1 is a diagrammatic side elevation of a fragment of a vehicle on which the track chain of the present invention may be employed;

Fig. 2 is a side elevation of a portion of the track chain, on a somewhat larger scale than Fig. 1;

Fig. 3 is a vertical section taken substantially on the line 3—3 of Fig. 1;

Fig. 4 is a horizontal section taken substantially on the line 4—4 of Fig. 2;

Fig. 5 is a vertical section taken substantially on the line 5—5 of Fig. 3;

Fig. 6 is a plan of one of the blocks used in the track chain;

Fig. 7 is a section through a pair of pins and connecting links formed integrally in one piece;

Fig. 8 is a view similar to Fig. 2 showing a modified form of the invention;

Fig. 9 is a vertical section taken substantially on the line 9—9 of Fig. 8;

Fig. 10 is a horizontal section through the form of construction shown in Figs. 8 and 9;

Fig. 11 is an elevation of a fragment of one of the blocks used in Fig. 8, with parts broken away and parts in section;

Fig. 12 is a perspective view of one of the parts of the construction, and

Fig. 13 is a view similar to a portion of Fig. 9 showing a further modified form of the invention.

The same reference numerals throughout the several views indicate the same parts.

Referring now to Fig. 1, there is shown diagrammatically a vehicle body 20 on which is mounted a sprocket 21 secured to the vehicle body or frame in any suitable way. Over this sprocket and another sprocket or idler spaced therefrom, runs a vehicle track chain denoted in general by the numeral 22. As the vehicle advances, successive portions of the chain are laid upon the ground surface 23 and form a trackway over which the vehicle supporting wheels or rollers may travel. Two of such vehicle supporting wheels are illustrated diagrammatically at 24, mounted on a bogie truck member 25 which, in turn, is connected to the vehicle body in any suitable manner such as by the spring suspension diagrammatically indicated at 26.

It will be obvious to those skilled in the art that as the vehicle advances, the wheels 24 roll over the track 22, and at or near the rear end of the vehicle, the track chain is picked up from the ground, passes around the rear sprocket or idler, moves forwardly along the upper reach of the chain to the sprocket 21, and passes around this sprocket to be laid on the ground again.

The vehicle may be driven by power applied to the sprocket 21, or in any other suitable manner.

The construction of the chain 22 itself forms the particular subject matter of the present invention. According to this invention the chain is made up of a series of members 30 which may be conveniently referred to as pins, which extend in a direction laterally or transversely of the chain and which are spaced from each other in a direction longitudinally of the chain. These members are connected to each other in pairs, preferably in such manner that the transverse members or pins constituting any one pair are connected rigidly or non-rotatably with respect to each other. This connection may be by means of separate links 31 pressed or driven tightly onto the pins with such force as to hold the pins against rotation, as shown in Fig. 4, or the two pins and connecting links of each pair may all be formed integrally from a single piece of material, as shown in Fig. 7, in which the pins or transverse members are shown at 30ª and the connecting portions are shown at 31ª, such integral connecting portions being intended to be included within the term "links" as used in this specification and in the accompanying claims, since they perform substantially the same functions as the separate links 31 shown in Fig. 4.

The pins 30 and the links 31 (or 30ª and 31ª) are made from any suitable strong and rigid material such as steel or the like. The term "rigid" as used in describing these and other parts of the construction is intended to be used in its ordinary sense as meaning metal or other material which is relatively firm and unyielding as distinguished from resilient and yielding materials such as rubber or the like.

In the preferred construction, the track chain is made of what might be termed "double width", with a space along the center line in which the teeth of the sprocket 21 may fit and with track portions or tread portions on each side of this center line. It may be made, of course, of single width or multiple width as desired. In the preferred double width construction, two links 31 (or 31ª) are used for connecting each pair of pins 30 to each other, and these links are spaced somewhat from each other, as shown in Figs. 3, 4, and 7, so that a roller 32 may be placed on each pin between the links, which roller is engaged by the teeth of the sprocket 21 in use, and which results in reducing friction. In the integral one-piece construction shown in Fig. 7, the central portion of each pin between the integral links 31ª may be somewhat enlarged as at 32ª to be of the proper size to fit the teeth of the sprocket 21.

The pins preferably extend laterally in both directions from the links 31, as shown particularly in Fig. 3 and on these extended ends of the pins there are mounted connecting means which serve to connect one pin of one pair to one pin of a different pair, thus connecting all of the pins in a continuous series to form the continuous track chain. These connecting means mounted on the pins preferably have associated therewith the ground engaging surfaces and the track forming surfaces of the track chain. Since the construction on one side of the center line may be identical with that on the opposite side of the center line, a description of the connecting means on one side of the chain will be sufficient.

The connecting means for connecting one pin of one pair to one pin of a different pair may be in the form of a block or link member 40 having a pair of hollow rounded portions 41 each encircling one of the pins 30. The encircling portions 41 are securely connected to each other, and preferably are both made from a single integral piece of strong and rigid material such as metal.

The inner wall surfaces of the encircling portions 41 are preferably substantially spaced from the pins 30 which they encircle, at least through the major portion of the width of each block, so that the walls of the block do not come into direct contact with the pin, and a filling or bushing of resilient material 45 is employed in the space between the pin 30 and the encircling portion of the block. Furthermore, this resilient material, such as rubber or rubber composition, is preferably secured non-rotatably both to the pin 30 and to the surrounding block 40, so that any relative oscillation or movement between these parts will be accompanied normally by deformation of the resilient filling without any substantial sliding contact between any of the parts.

The non-rotatable connection between the resilient filling or bushing and the other parts may be made either by forcing the resilient filling tightly into the space between the parts so that it will be secured to the parts by friction, or by actually fastening the resilient filling to the parts, or partly in one way and partly in the other. In the preferred construction, the resilient filling is fastened to the pin 30 by being vulcanized to a sleeve or bushing 46 of metal or other rigid material which is non-rotatably fixed to the pin 30 in any suitable manner. For example, a portion of the pin may be made of any suitable non-circular shape (such as being formed with the teeth 47) and the inner surface of the sleeve 46 may likewise be formed with a corresponding or complementary non-circular shape which, when engaged with the pin 30, will prevent relative rotation of the two. The sleeve 46 thus forms, in effect, a part of the pin 30 and is intended to be included within the term "pin" as used in the accompanying claims, except where otherwise plainly indicated.

The non-rotatable connection of the outer surface of the filling 45 with the member 40 may likewise be secured by vulcanizing the resilient member 45 to the member 40, though preferably the resilient filling is merely forced tightly into the opening in the member 40 under heavy pressure. With this construction, a non-rotatable connection with the member 40 is secured under normal conditions, relative movement of the pin 30 and member 40 being accompanied by displacement or deformation of the resilient body 45. But under extraordinary strains or relative oscillation through an extraordinary amplitude, the resilient filling 45 may then slip slightly within the surrounding member 40 without breaking or disintegrating any of the parts.

In the embodiment here illustrated, the entire block or connecting means 40 may be formed of metal or other suitable rigid material, and may have on its under side suitable ground engaging surfaces such as the lugs or feet 50, and on its upper side a suitable track surface such as the smooth flat surface 51 which, together with the similar and closely adjacent alined surfaces of the other blocks in the series, will form a trackway over which the vehicle supporting wheels 24 may roll. The feet 50 and track surfaces 51 on the blocks may extend the full width of the blocks or only a part of the width, as shown in Figs. 3 and 6.

Each block is preferably provided also with guiding means such as the upstanding lug 52 adapted to extend upwardly into a central groove in the wheels 24, as shown in Fig. 3, so as to keep these wheels accurately alined on the track chain.

The blocks may be retained on the pins in any suitable manner. For instance, the ends of the pins may be threaded and, as shown at the left hand side of Fig. 3, a nut 55 may be screwed onto the end of a pin to hold in place a washer 56 which overlaps the sleeve 46 and thus holds it on the pin, maintaining the block 40 in place because of the connection furnished by the resilient material 45. In some instances, however, it may be preferred not to rely upon the resilient material 45 to hold the blocks 40 in place, and it may be desired to employ, with the nut 55, a washer 57 of larger size, big enough to overlap somewhat onto the block 40 as shown at the right hand side of Fig. 3, and thus to hold the block in place on the pin even if the resilient filling 45 should become disintegrated or destroyed.

It is seen that by this construction a chain is provided which has an extremely long life even when used on sandy or gritty ground which would rapidly wear out the joints of chains heretofore employed. As the chain flexes, either in passing around the sprocket 21 or in bending over obstructions on the ground, the relative oscillation of successive parts of the chain results in deformation of the resilient filling 45, but causes substantially no sliding of one surface over another, because in this construction there is substantially no contact of surfaces which would slide upon each other during oscillation of the parts of the chain. The inner edges of the blocks 40 may be in contact with the sides of the links 31 or 31ª, but it is found that destructive wear does not take place rapidly at these points, so that this contact is not materially detrimental. The main wear in a track chain is the wear of the pivots on which the parts of the chain oscillate relatively to each other, and it is seen from this construction that wear at these points has been eliminated by the use of the resilient filling 45, which effectively keeps sand and grit out of the chain joints and which also separates the relatively oscillating parts from each other.

Referring now to Figs. 8 to 12 inclusive, there is here shown a slightly different form of chain which, under some circumstances, may be preferred to the form already described. This form is particularly useful where it is desired to reduce vibration and noise to a minimum.

The chain of the form shown in Figs. 8 to 12 inclusive may be identical with that described in connection with Figs. 1 to 7 inclusive insofar as concerns the pins 30 or 30ª, the links 31 or 31ª, the rollers 32, the resilient bushings 45, the sleeves 46, the nuts 55, and the washers 57, and these parts in Figs. 8 to 11 inclusive, have, accordingly been given the same reference numerals. The pins 30 and links 31 in this embodiment of the invention may be constructed either of separate pieces or of the integral form shown in Fig. 7, as desired.

In this present embodiment of the invention, instead of making the connecting means or block 40 entirely or substantially entirely of a single piece of metal, it is here constructed of what might be termed a skeleton of metal or other suitable rigid material, which skeleton may be of the shape best shown in Fig. 12. It comprises, for example, a pair of rounded hollow pin-encircling portions 61 corresponding in general to the encircling portions 41 of the previous embodiment. But instead of connecting these encircling portions to each other by a wide filling or web of rigid material such as metal, as was done in the previously described embodiment, they are here connected only by a relatively narrow or thin web or connecting portion 60 of rigid material, as best seen in Fig. 12. The portions 61 may be formed integrally of a single piece with the portion 60, or they may be separate pieces securely fastened to the portion 60. In either case, the encircling portions 61 embrace the resilient bushings 45 as in the preceding embodiment.

Associated with these encircling portions 61 are ground engaging and track forming surfaces, one and preferably both of which are formed of resilient material. For example, in the preferred embodiment, a considerable body of resilient material 62, such as rubber or rubber composition, surrounds the two members 61 which are joined to each other, and is secured to them in any suitable manner, such as by being vulcanized to them. This resilient body 62 is extended downwardly as at 63 to form a surface for engaging the ground, and extended upwardly to form preferably a smooth flat surface 64 for providing a trackway over which the vehicle supporting wheels may roll.

The portions 60 of the block may have an upward extension 65 for guiding the vehicle wheels on the track, corresponding to the upwardly extending portion 52 of the previous embodiment of the invention.

It will be seen that this embodiment has the advantages previously enumerated in connection with the preceding embodiment of the invention, and in addition, has a further advantage that the ground engaging surface of the track chain is of resilient material such as rubber or rubber composition, and the track surface on which the vehicle wheels roll is also of resilient material such as rubber or rubber composition. Thus vibration and noise are reduced to a minimum, and the vehicle wheels roll smoothly over a resilient track.

A still further improvement is illustrated diagrammatically in Fig. 13 of the drawings, and may be applied to either of the embodiments of the invention previously described. This improvement consists in bringing a part of the encircling portion of the block into relatively close proximity to the pin 30 (or to the sleeve 46 surrounding the pin, which may be considered broadly as a part of the pin) as shown at 70 in Fig. 13. In other words, the portion of the block which is materially spaced from the pin extends throughout the major part of the width of the block, as before, and the resilient filling 45 is interposed between the pin and this spaced portion of the block. Throughout a minor part of the width of the block, however, the block is formed as at 70 to come into close proximity to the pin, preferably leaving only a slight clearance such as about $\frac{1}{32}$ of an inch.

With this construction, if the resilient filling 45 should disintegrate or work loose, the embracing portion 70 would then come into contact with the pin (or with its surrounding sleeve 45, which is considered broadly as a part of the pin) and would form a connection between the different parts of the chain which would enable continued use of the chain, at least temporarily until adequate repairs could be made.

Because of the close proximity of the extension 70 to the pin, the elongation of the chain even if all of the resilient fillings 45 were to wear out, would be quite limited, and thus the chain would be kept approximately at its original length without danger of undue elongation which might cause the chain to run off the sprocket or otherwise render it unsatisfactory. If this extension 70 were not provided, it is apparent that the destruction of the resilient filling 45 would result in elongation of the chain by an amount equal to the original thickness of this filling, and if the filling were disintegrated or destroyed in any considerable number of links, the resulting total elongation of the entire chain, without the improvement illustrated in Fig. 13, would be large, with consequent danger of the chain running off the sprocket.

It is obvious to those skilled in the art that the improvement of Fig. 13 is applicable to any chain of this type in which resilient fillings are used, whether the entire block be of metal as in Figs. 3 to 6 inclusive, or whether a resilient body be used to form the ground engaging and track forming surfaces of the block, as in Figs. 8 to 11 inclusive.

From the foregoing description, it is seen that there is provided a vehicle track chain or band made up of a longitudinally spaced series of transversely extending members or pins 30, connected to each other in pairs by means of the links 31. Also one member 30 of each pair is connected to one member of another pair by means of the links or blocks 40—41 (or 60—61). Each of these last mentioned links or blocks may be said to comprise a metallic portion 41 (or 61) connected to another metallic portion 41 (or 61) by a connecting portion 40 (or 60).

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A vehicle track chain comprising a series of shoes connected to each other to form a substantially continuous trackway over which a vehicle supporting wheel may roll, each of said shoes comprising a metal plate lying substantially in a vertical plane extending longitudinally in the direction of the track at one side of the shoe, said plate being relatively thin in a direction transversely of the track in comparison to its length in a direction longitudinally of the track and its height in a direction vertically of the track, two metal tubes each secured rigidly to and extending laterally from said plate, a block of rubber-like material surrounding said tubes and lying against but not surrounding said plate, said rubber-like block having a bottom surface for engaging the ground and a substantially flat smooth top surface forming a section of said trackway over which a vehicle supporting wheel may roll, and means extending laterally into each tube of each shoe for connecting each shoe to the next adjacent shoes in front of and behind it.

2. A vehicle track chain comprising a series of shoes connected to each other to form a substantially continuous trackway over which a vehicle supporting wheel may roll, each of said shoes comprising a metal plate lying substantially in a vertical plane extending longitudinally in the direction of the track at one side of the shoe, said plate being relatively thin in a direction transversely of the track in comparison to its length in a direction longitudinally of the track and its height in a direction vertically of the track, two metal tubes each secured rigidly to said plate and extending substantially perpendicularly therefrom and substantially parallel to each other, a block of rubber-like material surrounding said tubes but not surrounding said plate, said rubber-like block having a bottom surface for engaging the ground and a substantially smooth top surface forming a section of said trackway over which a vehicle supporting wheel may roll, means extending laterally into one tube of each shoe for connecting that shoe to the next adjacent shoe in one direction, and means extending laterally into the other tube of each shoe for connecting that shoe to the next adjacent shoe in the opposite direction.

3. A vehicle track chain comprising a series of shoes connected to each other to form a substantially continuous trackway over which a vehicle supporting wheel may roll, each of said shoes comprising a metal side member running longitudinally along one side of the shoe, two metal tubular members spaced from each other and rigidly connected to and extending laterally from said side member, a mass of rubber-like material surrounding said tubular members and having a bottom surface for engaging the ground and a top surface forming a section of said trackway, means extending into one of the tubular members of each shoe for connecting that shoe to the next adjacent shoe in one direction, and means extending into the other of the tubular members of each shoe for connecting that shoe to the next adjacent shoe in the opposite direction.

4. A vehicle track chain comprising a series of shoes connected to each other to form a substantially continuous trackway over which a vehicle supporting wheel may roll, each of said shoes comprising a metal side member running longitudinally along one side of the shoe, two metal tubular members spaced from each other and rigidly connected to and extending laterally from said side member, a mass of rubber-like material surrounding said tubular members and having a bottom surface for engaging the ground and a top surface forming a section of said trackway, said side member having a portion extending upwardly to project a material distance above said top surface of said rubber-like material to form a guide tending to prevent lateral displacement of a wheel rolling on said trackway, means extending into one of the tubular members of each shoe for connecting that shoe to the next adjacent shoe in front of that shoe, and means extending into the other of said tubular members of each shoe for connecting that shoe to the next adjacent shoe behind that shoe.

5. A vehicle track chain comprising a series of shoes connected to each other to form a substantially continuous trackway over which a vehicle supporting wheel may roll, each of said shoes comprising a metal side member running longitudinally along one side of the shoe, two metal tubular members spaced from each other and rigidly connected to and extending laterally from said side member, said tubular members having substantially no rigid connection with each other save through said side member, a mass of rubber-like material surrounding said tubular members but not surrounding said side member and having a top surface forming a section of said trackway and a bottom surface extending to a level below the bottom of said side member for engaging the ground, means extending into one of the tubular members of each shoe for connecting that shoe to the next adjacent shoe in front of that shoe, and means extending into the other of said tubular members of each shoe for connecting that shoe to the next adjacent shoe behind that shoe.

6. A vehicle track chain comprising two series of track shoes connected to each other to form a substantially continuous trackway over which a vehicle supporting wheel may roll, the shoes of each series being substantially alined with each other in a direction longitudinally of the track, and the shoes of one series being spaced laterally a slight distance from the shoes of the other series to provide between the two series a space adapted to receive a sprocket, each shoe comprising a rigid frame including two metallic tubular members extending transversely of the shoe substantially parallel to each other and metallic means rigidly connecting them to each other and a mass of rubber-like material surrounding said tubular members and having a bottom surface for engaging the ground and a substantially flat top surface forming a section of said trackway, a series of pins, one pin extending into each of said tubular members and each pin extending across said space between the two series of shoes and into one tubular member of a shoe of one series and also into one tubular member of a shoe of the other series, and link means connecting each pin extending into one shoe of one series with one pin extending into a different shoe of the same series.

7. A vehicle track chain comprising two series of track shoes connected to each other to form a substantially continuous trackway over which a vehicle supporting wheel may roll, shoes of each series being substantially alined with each other in a direction longitudinally of the track, and the shoes of one series being spaced laterally a slight distance from the shoes of the other series to provide between the two series a space adapted to receive a sprocket, each shoe comprising a rigid frame including two metallic tubular members extending transversely of the shoe substantially parallel to each other and metallic means rigidly connecting them to each other and a mass of rubber-like material surrounding said tubular members and having a bottom surface for engaging the ground and a substantially flat top surface forming a section of said trackway, a series of pins, one pin extending into each of said tubular members and each pin extending across said space between the two series of shoes and into one tubular member of a shoe of one series and also into one tubular member of a shoe of the other series, and link means located in said space between the two series of shoes and connecting each pin extending into one shoe of one series with one pin extending into a different shoe of the same series.

8. A vehicle track chain comprising two series of track shoes connected to each other to form a substantially continuous trackway over which a vehicle supporting wheel may roll, the shoes of each series being substantially alined with each other in a direction longitudinally of the track, and the shoes of one series being spaced laterally a slight distance from the shoes of the other series to provide between the two series a space adapted to receive a sprocket, each shoe comprising a rigid frame including two metallic tubular members extending transversely of the shoe substantially parallel to each other and metallic means rigidly connecting them to each other and a mass of rubber-like material surrounding said tubular members and having a bottom surface for engaging the ground and a substantially flat top surface forming a section of said trackway, a series of pins, one pin extending into each of said tubular members, and each pin extending across said space between the two series of shoes and into one tubular member of a shoe of one series and also into one tubular member of a shoe of the other series, a bushing of resilient rubber-like material within each tubular member to separate each tubular member from substantial metallic bearing contact with the pin extending into it, and link means rigidly connecting each pin extending into one shoe of one series with one pin extending into a different shoe of the same series.

9. A vehicle track chain comprising two series of track shoes connected to each other to form a substantially continuous trackway over which a vehicle supporting wheel may roll, the shoes of each series being substantially alined with each other in a direction longitudinally of the track, and the shoes of one series being spaced laterally a slight distance from the shoes of the other series to provide between the two series a space adapted to receive a sprocket, each shoe comprising a rigid frame including two metallic tubular members extending transversely of the shoe substantially parallel to each other and a substantially vertical metallic web extending along the inner longitudinal edge of each shoe and connecting the two tubular members rigidly to each other and a mass of rubber-like material surrounding said tubular members and lying against one side of but not surrounding said vertical web, said mass having a bottom surface for engaging the ground and a substantially flat top surface forming a section of said trackway, a series of pins, one pin extending into each of said tubular members and each pin extending across said space between the two series of shoes and into one tubular member of a shoe of one series and also into one tubular member of a shoe of the other series, and link means connecting each pin extending into one shoe of one series with one pin extending into a different shoe of the same series.

10. A vehicle track chain comprising a series of shoes connected to each other to form a substantially continuous trackway over which a vehicle supporting wheel may roll, each of said shoes including a body having therein two openings extending transversely in the body, a metallic sleeve within each opening and spaced radially inwardly from at least a part of the surrounding walls of the opening, a filling of resilient rubber-like material between said sleeve and the surrounding walls of the opening, a circumferentially extending series of longitudinally extending teeth on the inner surface of a portion of said sleeve, a pin extending into each sleeve of each shoe, each pin having on a portion of its periphery a circumferentially extending series of longitudinally extending teeth for meshing cooperation with the teeth on the sleeve, and means connecting each pin extending into one shoe with one pin extending into an adjacent shoe to connect all of the shoes together in series.

11. A vehicle track chain comprising a series of shoes connected to each other to form a substantially continuous trackway over which a vehicle supporting wheel may roll, each of said shoes including a body having therein two openings extending transversely in the body, a metallic sleeve within each opening and spaced radially inwardly from at least a part of the surrounding walls of the opening, a filling of resilient rubber-like material between said sleeve and the surrounding walls of the opening, a series of longitudinally extending teeth of relatively small size extending uniformly around the entire inner surface of a portion of said sleeve, a pin extending into each sleeve of each shoe, each pin having on a portion of its periphery a similar series of similar teeth for meshing cooperation with the teeth on the sleeve, so that each pin may be inserted in its sleeve in any one of a large number of angular positions differing from each other by the angular spacing between two adjacent teeth, and means connecting each pin extending into one shoe with one pin extending into an adjacent shoe to connect all of the shoes together in series.

12. A vehicle track chain comprising a series of shoes connected to each other to form a substantially continuous trackway over which a vehicle supporting wheel may roll, each of said shoes including a body having therein two openings extending transversely in the body, a metallic sleeve within each opening and spaced radially inwardly from at least a part of the surrounding walls of the opening, a filling of resilient rubber-like material between said sleeve and the surrounding walls of the opening, a circumferentially extending series of longitudinally extending teeth on the inner surface of said sleeve throughout a portion of its length, said inner surface being smooth throughout another portion of its length, a pin extending into each sleeve of each shoe, each pin having a similar series of teeth throughout a portion of its length for meshing cooperation with the teeth of the sleeve and having a smooth periphery throughout another portion of its length for bearing against the smooth portion of the inner surface of the sleeve, and means connecting each pin extending into each shoe with one pin extending into an adjacent shoe.

13. A vehicle track chain comprising a series of shoes connected to each other to form a substantially continuous trackway over which a vehicle supporting wheel may roll, each of said shoes including a body having therein two openings extending transversely in the body, a metallic sleeve within each opening and spaced a substantial distance radially inwardly from the surrounding walls of the opening throughout a part of the length of the sleeve, another part of the length of the sleeve being closely adjacent but normally slightly out of contact with the surrounding walls of the opening, a filling of resilient rubber-like material between said sleeve and the part of the surrounding walls of the opening which is spaced a substantial distance from the sleeve, said filling normally serving to transmit and resist radial stress between said sleeve and the walls of said opening, said closely adjacent part of the walls of said opening being capable of coming into contact with said sleeve to transmit and resist such stress when said filling is disintegrated or subjected to abnormal stress, a series of teeth on the inner surface of a portion of said sleeve longitudinally removed a substantial distance from the portion which may contact with the closely adjacent part of the walls of said opening, the inner surface of the sleeve being substantially smooth throughout that portion of the length of the sleeve which may contact with said closely adjacent part, a pin extending into each sleeve of each shoe, each pin having a similar series of teeth throughout a portion of its length for cooperation with the teeth of the sleeve and having a substantially smooth periphery throughout another portion of its length for bearing against the smooth portion of the inner surface of the sleeve, and means connecting each pin extending into each shoe with one pin extending into an adjacent shoe.

14. A vehicle track chain comprising a series of track shoes each including two metal tubular members spaced from each other and extending transversely of the shoe, metallic means forming a rigid connection between said two tubular members, said rigid connecting means occupying only a minor part of the width of the shoe, leaving a free open space extending from top to bottom of the shoe between said tubular members throughout the major part of the width of the shoe, and a mass of resilient rubber-like material surrounding said tubular members and substantially filling said space between them and forming a resilient block having a lower surface for engaging the ground and an upper surface forming, collectively with the upper surfaces of other blocks of the same track chain, a trackway over which a vehicle supporting wheel may roll, said track chain further comprising a transverse member extending into each tube of each shoe, and link means connecting the transverse member extending into one tube of one shoe with the transverse member extending into an adjacent tube of an adjacent shoe.

15. A vehicle track chain comprising a series of track shoes each including two metal tubular members spaced from each other and extending transversely of the shoe, metallic means forming a rigid connection between said two tubular members, said rigid connecting means occupying only a minor part of the width of the shoe, leaving a free open space extending from top to bottom of the shoe between said tubular members throughout the major part of the width of the shoe, and a mass of resilient rubber-like material surrounding said tubular members and substantially filling said space between them and forming a resilient block having a lower surface for engaging the ground and an upper surface forming, collectively with the upper surfaces of other blocks of the same track chain, a trackway over which a vehicle supporting wheel may roll, said track chain further comprising a transverse member extending into each tube of each shoe, link means rigidly and non-rotatably connecting the transverse members extending into one tube of one shoe with the transverse member extending into an adjacent tube of an adjacent shoe, and a bushing of resilient rubber-like material within each tubular member and surrounding the transverse member extending thereinto.

16. As a new article of manufacture, a shoe for a vehicle track chain, said shoe comprising a block of resilient rubber-like material of substantial size having a bottom surface for engaging the ground and a top surface adapted to form, collectively with the top surfaces of other similar shoe blocks, a trackway over and along which a vehicle supporting wheel may roll, a metal tubular member extending transversely into said resilient block near one end thereof and adapted to receive pin means for connecting the shoe to an adjacent shoe in one direction, a second metal tubular member extending transversely into said resilient block near the opposite end thereof and adapted to receive pin means for connecting the shoe to an adjacent shoe in the opposite direction, and metallic web means rigidly connecting said two metallic tubular members to each other and adapted to resist tension stresses tending to pull said two tubular members away from each other and torsional stresses tending to turn one of said tubular members relatively to the other, said connecting web means occupying only a relatively small part of the width of said shoe, said two tubular members being spaced from each other throughout the major part of the width of said shoe, and the peripheries of said tubular members being spaced materially inwardly from the top, bottom, and end surfaces of said block so that said block includes a mass of resilient material of substantial thickness entirely surrounding both tubular members throughout a substantial part of the width of the shoe and extending entirely from top to bottom of the block through the space between the two tubular members.

17. In an endless track construction, in subcombination, a pair of longitudinally spaced link members; a laterally disposed pin extending through each link member and rigidly secured thereto, said pins projecting laterally beyond both sides of said link members; a pair of tread members connecting the longitudinally aligned projecting portions of said pins; and means for yieldingly resisting turning movement of said pins with respect to said treads.

18. The construction described in the above claim 17, wherein said means comprises bodies of rubber working in shear.

DAVID FERGUSSON.